UNITED STATES PATENT OFFICE.

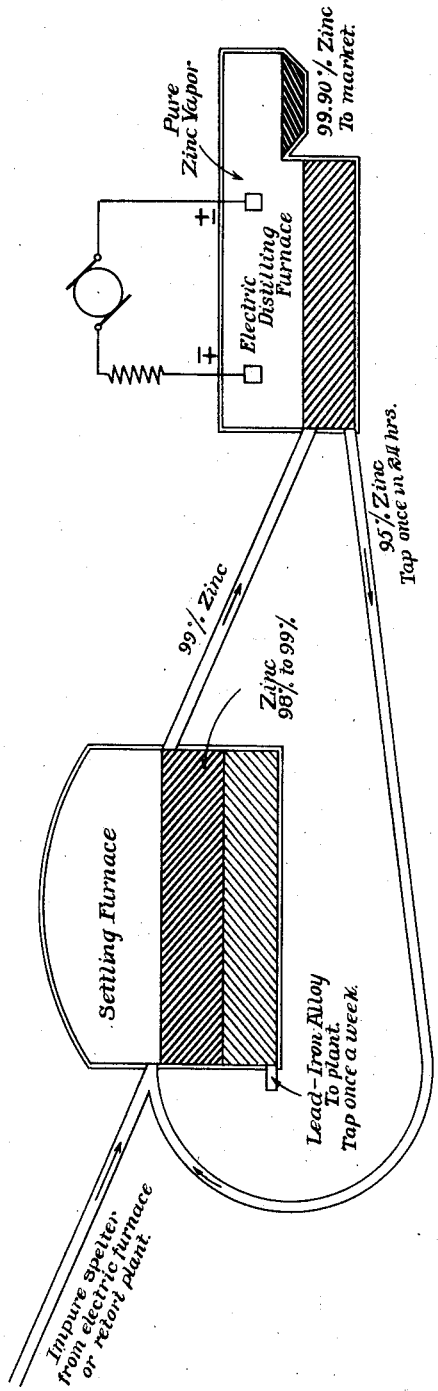

WOOLSEY McA. JOHNSON, OF HARTFORD, CONNECTICUT.

EBULLIENT REFINING PROCESS.

1,333,721.      Specification of Letters Patent.     Patented Mar. 16, 1920.

Application filed February 12, 1916. Serial No. 77,872.

*To all whom it may concern:*

Be it known that I, WOOLSEY McA. JOHNSON, a citizen of the United States, and residing at Hartford, in the county of Hartford and State of Connecticut, have invented a new and Improved Ebullient Refining Process, of which the following specification is a full disclosure.

In its more comprehensive aspect, this process contemplates the purification of spelter made by electrothermic, electrolytic or the conventional pyrometallurgic processes, with especial reference to the removal of such impurities as aluminum and chlorin. In its intense aspect, it is applied to the purification of electrothermic spelter as made by the "Johnson process" for treating complex zinc lead roasted sulfids.

My new process will be understood by reference to the accompanying diagrammatic drawing and in connection with the following disclosure.

It is a general principle of the broad philosophy of metallurgy that concentrating or smelting processes should be carried on at a maximum rate with the idea of attaining a "tonnage of ore", whereas refining processes should be carried slowly and deliberately with the idea of obtaining "grade of metal".

Accordingly, in smelting zinc ores in my continuous electric zinc furnace, making spelter, slag, copper matte and base lead bullion in one operation, we make a spelter containing noteworthy amounts of such impurities as sodium, magnesium, copper, iron, lead, silver, iron and aluminum. Also, when sodium chlorid is added to promote condensation, as is also done in the retorting practice, a certain amount of Cl is present. All these impurities, especially aluminum and chlorids, affect the properties of spelter for rolling into sheets, for the best galvanizing and especially at the present time for the manufacture of cartridge brass. To enable the zinc producer to satisfy properly the requirements of the consumer as regards quality is the prime purpose of this invention.

I, therefore, propose first to settle out from electrothermic spelter (A) 97.5% zinc, 2% lead, 0.35% Fe and 0.25% other impurities, all lead and iron possible in the conventional manner as described in *Ingalls' Metallurgy of Zinc and Cadmium*, pages 563 to 579, doing this in a continuous manner if desired.

A product "B" is then made analyzing 99% zinc, 0.1% Fe, 0.8% Pb and 0.1% minor impurities.

This is delivered to an electric furnace of the arc or overhead resistance type, although a retort redistilling furnace can be used. On the surface of the metal floats a 1" layer of zinc oxid for the specific hereinafter described purpose, and which as a poor conductor of heat mollifies and softens the glare of the arc, thereby tending to slower and more regular distillation. Now, as the zinc vapor passes through this carrying such impurities as aluminum, the aluminum and its analogues re-act as follows:

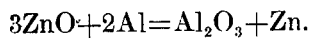
$$3ZnO + 2Al = Al_2O_3 + Zn.$$

It is not generally known that aluminum is present in spelter but this is due to faulty analytical methods used. Spelter always carries from .003 to .03 Al, depending on temperature of retorting. My electric furnace spelter under unusual conditions has run as high as 0.10% Al; sometimes retort spelter analyzes .03 or .02.

I have determined the temperature at which zinc oxid is reduced to the metallic state by metallic aluminum to be from 895 to 915° C. or just below the boiling point of zinc.

As aluminum has in gaseous phase a most powerful reactive affinity for zinc oxid, a large proportion, all if desired, can be eliminated. The percentage of lead is reduced accordingly to vapor pressure curve of zinc and lead and to the laws of partial pressure. Spelter distilled with an inflow of indifferent gas or under vacuum below 920° C. or at atmospheric pressure can have very low lead content.

Theoretically and practically, spelter made

At 858 C. and 380 Mms. should carry .017 Pb.
At 948 C. and 760 Mms. should carry .031 Pb.
At 972 C. and 760 Mms. should carry .05 Pb.
At 1003 C. and 760 Mms. should carry .11 Pb.

It is seen that the lead and its analogues can be removed either by simple distillation or by the use of a porous, removable plug, or a filter which can be cleaned and whose temperature can be controlled, and which keeps temperature such that lead is filtered out.

We have thus produced a product "C" analyzing typically as follows:

| | |
|---|---|
| Zinc | 99.941 |
| | 99.9390 (by difference) |
| Fe | .0030 |
| Cu | .0006 |
| Cd | .0060 |
| Al | .0010 |
| Na—Mg | .0030 |
| Pb | .0400 |
| Cl and O | .0074 |

N. B.—Cadmium and its analogues are eliminated in the preparing operation, as described in my co-pending application No. 854,169, filed July 30, 1914.

When the residual spelter in the distilling furnace reaches 5% lead it is tapped off and charged with "A" in the settling furnace, for otherwise lead would tend to be carried over mechanically, and the aim of the metallurgist should be to flow the low-grade spelter through the distilling furnace so fast that conditions are practically constant.

The redistilled zinc "C" is now tapped into a gas-fired furnace of the reverberatory type and subjected to a "poling" or "churning" operation in a manner similar to the method used in the metallurgy of copper, save that one large green pole cannot usually be used but rather a plurality of clean well-dried southern pine 2"x4" joists. These are submerged in the usual manner in the metal and are destructively distilled. If well dried, no water vapor which tends to oxidize the zinc is produced, but rather hot hydrocarbons.

The sweep of gas eliminates all volatile impurities, such as zinc and chlorid. A small amount of deoxidizer, such as vanadium, can be added if desired. Finally, the bath is cooled to approximately the melting point of zinc 419° C. to allow the solid non-metallic impurities, such as zinc oxid, to rise and float on surface, and hold them for a time, then the temperature is raised to a good pouring temperature, say 500° C., and the zinc cast in a machine-casting apparatus, such as the Walker casting-machine, into conventional slabs.

Having thus revealed this invention, I claim as new and desire to secure the following combinations of steps, or equivalents thereof, by Letters Patent of the United States:

1. A process for removing during redistillation of spelter a volatile impurity having greater affinity for oxygen than zinc, consisting in passing the vaporized product through a layer of zinc oxid thereby oxidizing and rendering said impurity non-volatile.

2. A process for removing during redistillation of spelter a volatile impurity having greater affinity for oxygen than zinc, consisting in passing the vapors through a porous layer of zinc oxid thereby oxidizing the volatile impurity.

3. A process of removing a volatile acid impurity from spelter consisting in passing therethrough a hot water-free hydrocarbon gas with simultaneous agitation of the spelter.

4. A process of removing a volatile zinc chlorid impurity from spelter consisting in passing through said spelter hot hydrocarbon gases during an agitation of said spelter.

In witness whereof, I hereunto subscribe my name, as attested by the two subscribing witnesses.

WOOLSEY McA. JOHNSON.

Witnesses:
 LEON MINTZ,
 B. COOKE.